United States Patent [19]

Hamada et al.

[11] 4,350,510

[45] Sep. 21, 1982

[54] CENTRIFUGAL SEPARATOR

[75] Inventors: Isao Hamada; Hiroshi Nakayama; Nobuyoshi Kawakami; Hirotaka Azami; Tadasu Ikeda, all of Hitachi; Yasumasa Yukawa; Hiroshi Mitani, both of Kurashiki; Takashi Ohmori, Yokohama; Masanobu Kimura, Kurashiki; Kohichi Seno, Chofu, all of Japan

[73] Assignees: Hirachi, Ltd.; Nippon Mining Co., Ltd., both of Tokyo, Japan

[21] Appl. No.: 215,843

[22] Filed: Dec. 12, 1980

[30] Foreign Application Priority Data

Dec. 12, 1979 [JP] Japan .................................. 54-160241

[51] Int. Cl.³ .......................................... B01D 45/12
[52] U.S. Cl. ...................................... 55/349; 55/394; 55/419; 55/459 R
[58] Field of Search ............. 55/449, 450, 451, 459 R, 55/345-348, 349, 394, 459 A, 459 B, 459 C, 459 D

[56] References Cited

U.S. PATENT DOCUMENTS

| | | | |
|---|---|---|---|
| 420,296 | 1/1890 | Curtis | 55/394 |
| 933,566 | 9/1909 | Kennedy | 55/449 |
| 2,422,563 | 6/1947 | Pegg | 55/349 |
| 2,963,109 | 12/1960 | Brookman | 55/349 |
| 2,981,369 | 4/1961 | Yellott et al. | |
| 3,074,218 | 1/1963 | O'Dell et al. | |
| 3,443,368 | 5/1969 | Wilson et al. | 55/449 |
| 3,590,558 | 1/1971 | Fernandes | 55/449 |

Primary Examiner—Bernard Nozick
Attorney, Agent, or Firm—Craig and Antonelli

[57] ABSTRACT

A centrifugal separator comprises a centrifugation chamber, gas inlet ports for introducing a gas into the centrifugation chamber so as to whirl the gas, a clean gas discharge pipe provided on the upper portion of the centrifugation chamber, and a guide member secured to the lower portion of the centrifugation chamber. The guide member has an annular groove, outer fine holes made in the groove, a guide portion projecting conically inward the centrifugation chamber, and an inner hole made in the center of the guide portion. A gas including particles is introduced into the centrifugation chamber, in which the particles are separated. The separated particles are trapped in the groove with gas, then discharged from the outer holes. The clean gas removed of the particles is guided by the guide member to direct to the gas discharge pipe, at the same time the particles with gas toward the guide member also are guided by the guide member to be subjected to the centrifugal force.

9 Claims, 8 Drawing Figures

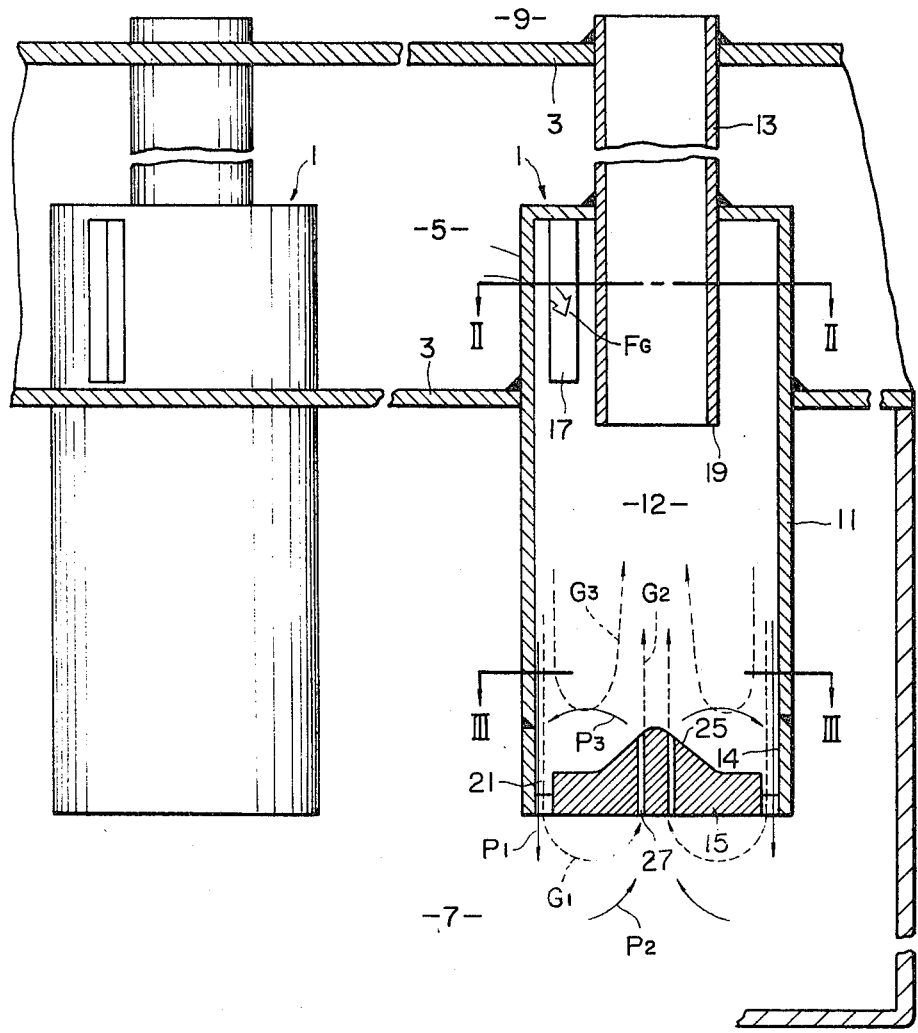
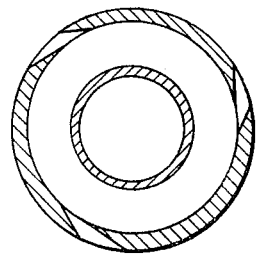
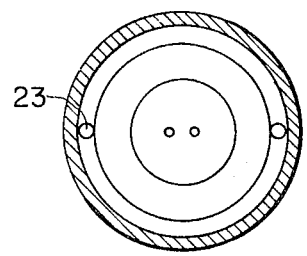
FIG. 1
FIG. 2
FIG. 3

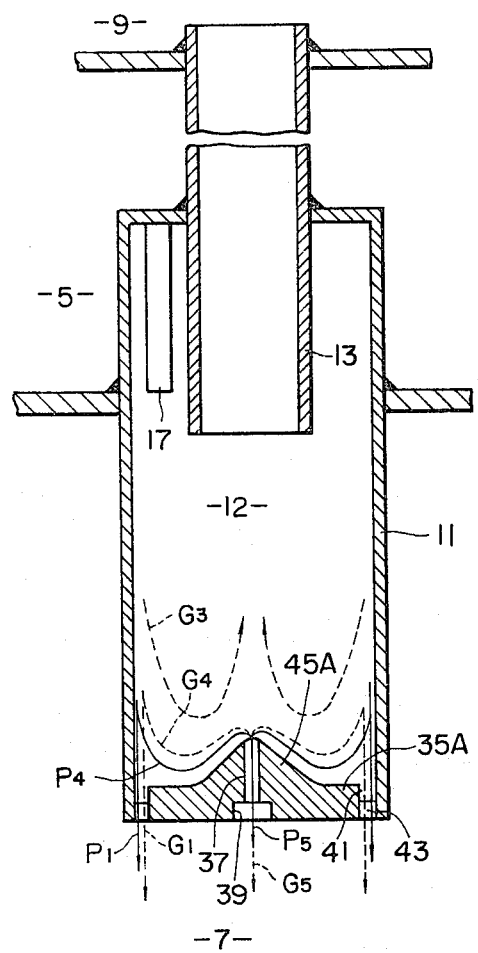
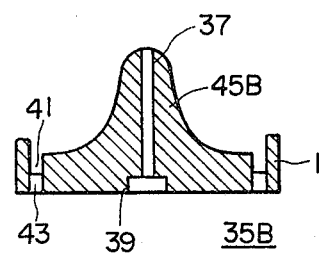
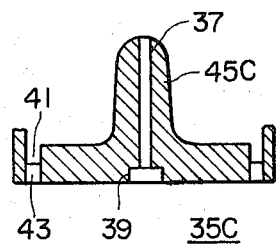

CENTRIFUGAL SEPARATOR

BACKGROUND OF THE INVENTION

This invention relates to a centrifugal separator for separating solid particles or colloidal particles suspended in fluid by subjecting them to the centrifugal force, and more particularly to a centrifugal separator for separating solid particles from a gas and used in a multicentrifuge.

As a means to remove particles suspended in gases a multicentrifuge has been used widely which containes a number of relatively small unit centrifugal separators in it. The multicentrifuge has a problem that there is a large difference in performance between the small unit centrifugal separators contained in the multicentrifuge and the multicentrifuge as a whole. For example, each unit centrifugal separator can remove 100% of the suspended particles of a size more than $10\mu$, while the multicentrifuge can remove only 20 to 30% of them.

According to the conventional explanation, the big difference in performance between the unit centrifugal separator and the multicentrifuge was said to be attributable to the ununiform velocity of gas at the inlet of the centrifugation chamber of the multicentrifuge. This is not logical, however, considering the fact that the speed of gas flow immediately before and within the centrifugation chamber is about 5 to 10 times the speed of gas being led to the multicentrifuge. Further, it has been found with experiment that the gas flow speed at the entrance of the centrifugation chamber is almost uniform and cannot cause such a drastic deterioration of the performance. A conventional centrifugal separator is provided with a centrifugation chamber formed cylindrically and having relatively narrow particle discharge port at the lower end, an inlet body disposed at the upper portion, and a pipe for discharging clean gas separated of particles. A gas containing particles is introduced into the centrifugation chamber from the inlet body so as to whirl so that the particles in the gas are forced radially outwardly by the centrifugal force exerted upon them. The particles gradually move down circling along the cylindrical inner wall of the centrifugation chamber until they reach the particle discharge port, then they are exhausted into a particle accumulator chamber below the centrifugation chamber. The clean gas removed of the particles is led up through the opening of the gas discharge pipe disposed at the center of the centrifugation chamber into a clean gas chamber out of the centrifugation chamber. This is a general explanation on the principle of the conventional centrifuge. If a plurality of unit centrifuges are put together and used as a multicentrifuge, the performance decreases greatly as mentioned previously. The real cause of this performance deterioration has so far not been throughly investigated. Our research and experiments have shown that this is caused by the powerful circulating motion of the gas at the particle discharge port of the centrifugation chamber. The strong circling motion of the gas and particles at the particle discharge port causes the gas and particles in the particle accumulator chamber to be drawn up into the central portion of the centrifugation chamber. In other words, the outgoing and incoming gas flows passing through the particle discharge port deteriorate the performance of the multicentrifuge. The unit centrifugal separator also has the particle flow and the gas flows passing through the particle discharge port. But with the unit centrifugal separator, the circling motion of the gas is maintained in the particle accumulator chamber disposed outside the particle discharge port, so that the particles in the accumulator chamber is forced radially outwardly or away from the center. As a result, the gas flow returning into the centrifugation chamber contains almost no particles. On the other hand, in the multicentrifuge which has a number of closely arranged particle discharge ports, the whirling return gas flows disturb each other producing complex turbulent flows in the particle accumulator chamber. This causes the particles to be drawn into the centrifugation chamber, together with the return gas flow. This particle flow is then led through the pipe into the clean gas chamber greatly reducing the performance of the multicentrifuge. The performance of the multicentrifuge is determined by the speed of the turbulent flow in the particle accumulator chamber and the speed at which particles sink by gravity. For example, for the particles with specific gravity of 2 to 3, the natural sinking speed is 30 cm/sec for the particle size of $100\mu$ and 0.3 cm/sec for the particle size of $10\mu$. Considering the turbulent flow speed of 100 cm/sec in the particle accumulator chamber, it can safely be concluded that satisfactory separation cannot be expected even for the large particle size of $100\mu$ and that for the small particle size of about $10\mu$ no separation will be achieved.

As mentioned above, the conventional multicentrifuge has very low performance for the particle size less than $100\mu$ because of the strong turbulent return flows which send particles up into the centrifugation chamber and into the clean gas chamber. The other prior arts are as follows:

1. Japanese patent publication No. 43-22818 (1968) "Centrifuge"

This is concerned with the centrifuge having a closing member at the lower portion of a centrifugation chamber. The closing member is provided with an annular groove and holes at the circumference.

2. U.S. Pat. No. 3,074,218 (1968) "Gas cleaner"

The gas cleaner disclosed by FIG. 3 has a disk with a hole at the lower portion of a centrifugation chamber. Particles separated from gas are discharged from a hole made in the side wall of the chamber.

3. U.S. Pat. No. 2,981,369 (1961) "Vortical whirl separator"

This is concerned with vortical whirl separator having a closing member with holes.

SUMMARY OF THE INVENTION

An object of the invention is to provide a centrifugal separator whose performance is greatly improved by guiding a fluid such as gas subjected to centrifugation to direct it toward a discharge port without disturbing fluid flows in the centrifugation chamber.

Another object of the invention is to provide a centrifugal separator which can surely take particles flowing along the circumference of the centrifugation chamber out of the chamber and cause the particles flowing toward the axis of the centrifugation chamber to be subjected to the centrifugal force.

Briefly stated, the invention is characterized by means provided at the lower portion of the centrifugation chamber for trapping particles flowing along the circumference due to centrifugal force and for guiding a fluid flowing in or/and toward the lower portion so as to flow toward a fluid discharge port and causing the particles to be subjected to the centrifugal force.

The means, for example, comprises a guide member having a circumferential portion shaped to form the annular groove with holes in cooperation of the circumference of the centrifugation chamber, and a guide portion projecting into the centrifugation chamber. The annular groove traps particles flowing along the circumference of the centrifugation chamber and the trapped particles are discharged axially through the holes. The guide portion guides, for example, a gas separated of the particles and flowing downward to turn and direct to the gas discharge port for clean gas whereby the gas flow in the centrifugation chamber is not disturbed. The guide portion guide particles flowing in and toward the lower portion so as to be easily subjected to the centrifugal force.

By providing the guide member with a through hole at the central portion, the guide operation for the particles is promoted.

BRIEF DESCRIPTION OF THE DRAWINGS

FIG. 1 is a sectional view of an embodiment of a centrifugal separator according to the invention;

FIG. 2 is a sectional view taken along a line II—II of FIG. 1;

FIG. 3 is a sectional view taken along a line III—III of FIG. 1;

FIG. 4 is a sectional view of another embodiment of a centrifugal separator according to the invention;

FIG. 5 is a sectional view showing a modification of a guide member used in FIG. 4;

FIG. 6 is a sectional view showing another modification of the guide member used in FIG. 4;

DESCRIPTION OF THE PREFERRED EMBODIMENTS

Figure 7:
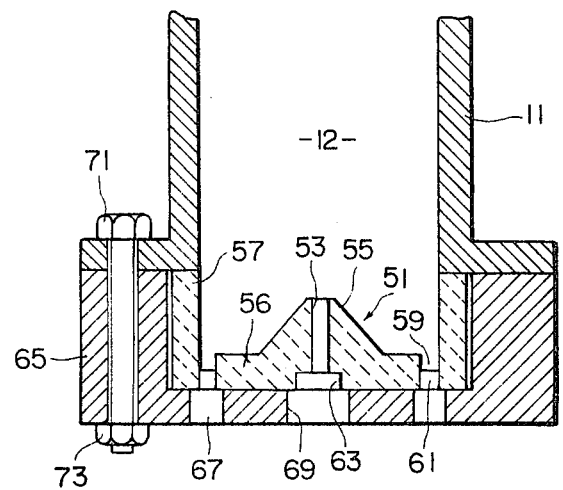
FIG. 7 is a sectional view of another embodiment of a centrifugal separator according to the invention.

Referring to FIGS. 1 to 3, an embodiment of a centrifugal separator according to the invention will be described hereinafter in detail.

In FIG. 1, a centfigual separator 1 is mounted on structual members 3 defining an gas intake chamber or passage 5, a particle accumulator chamber 7 and a clean gas chamber or passage 9. The separator 1 comprises a cylindrical housing 11 secured to one of the structural members 3 by welding, a pipe 13 secured to both the upper portion of the housing 11 and one of the structural members 3 so that the interior of the housing 11 will communicate with the clean gas chamber 9, and a guide member 15 secured to the lower portion of the housing 11 by welding, screw means or the like. The housing 11 defines therein a centrifugation chamber 12 and it is provided with a plurality of gas inlet ports 17 which are spaced equiangularly from each other as shown in FIG. 2, and formed so as to inject tangentially a gas from the intake chamber 5 into the centrifugation chamber 12 thereby whirling the gas. The lower end 19 of the pipe 13 is extended coaxially of the centrifugation chamber 12 and disposed lower than the inlet port 17. The guide member 15 is disk-shaped, and between the periphery of the guide member 15 and the inner wall of the housing 11 is formed an annular groove 21 which has vertically extending, small outer holes 23, through which the centrifugation chamber 12 communicates with the particle accumulator chamber 7, as shown in FIG. 3. The width of the groove 21 and the diameter of outer holes 23 are determined such that the largest particles contained in the gas can pass through them. The guide member 15 has a conical projection 25, which serves as gas guide, at the center on the upper surface. The guide member 15 is arranged so that the gas guide portion 25 projects toward the center of the centrifugation chamber 12. This gas guide portion 25 also has small inner holes 27 extending vertically through it near the top. The guide portion 25 is formed so that its horizontal cross sections, perpendicular to the axis of the centrifugation chamber 12, are circular. The outer holes 23 are formed adjacent to the inner wall of the centrifugation chamber 12. If a plurality of inner holes 27 are to be provided, it is desirable that they be formed on the same diameter circle.

A multicentrifuge is made by providing a plurality of the centrifugal separators 1 as abovementioned in adjacent relation. The gas intake passage 5, the particle accumulator chamber 7, and the clean gas passage 9 are common to all the separator 1. The particle accumulator chamber 7 is blown down for removing particles. Therefore the chamber 7 is relatively lower in pressure.

The operation of the centrifugal separator 1 of the above construction will be explained of separation of the particles from the gas.

Referring to FIG. 1, the gas flow $F_G$ loaded with particles is introduced, through the gas inlet port 17, into the centrifugation chamber 12 in which the gas is whirling while flowing downward, particles are separated from the gas by centrifugal force, and clean gas is discharged into the clean gas chamber, through the pipe 13. Then, the particle flow P1 together with a part of gas flow G1 enters the particle discharge groove 21. On the upper surface of the guide member 15 there is a pressure difference between the outer circumference and the central portion due to the whirling motion of the gas. This pressure difference causes the gas to flow from the circumference toward the center. However, the particles, which are revolving along the inner surface 14 of the centrifugation chamber 12, are subjected to the centrifugal force and therefore flow into the particle discharge groove 21. Once the particles get into the groove 21, it is very unlikely that the particles will be carried away by the gas flowing on the upper surface of the guide member 15 toward the center.

The particles circling in the annular groove 21 are discharged into the particle accumulator chamber 7 through the small outer holes 23, along with the gas. The gas G1 that flowed down into the particle accumulator chamber 7 enters the small inner holes 27 and is then drawn up into the centrifugation chamber 12 as shown by G2. These gas flows G1, G2 are generated by the pressure difference between the central portion of the guide member 15 and the outer circumference where the annular groove 21 is formed, this pressure difference being produced by the whirling motion of the gas in the centrifugation chamber 12. The gas flows are influenced by the pressure difference between the centrifugation chamber 12 and the particle accumulator chamber 7, and it is preferable that there are slow gas flows G1, G2.

Unlike conventional centrifugal separators, the centrifugal separator of this invention has at the lower end of the centrifugation chamber 12 the guide member 15 with the conical guide portion 25 which serves as a barrier against the return flow into the centrifugation chamber 12. That is, with this guide member 15, it is possible to greatly reduce the amount of particles P2 that will return to the centrifugation chamber 12 after being discharged, as indicated by P1, into the particle accumulator chamber 7. Therefore, the particles can be prevented from coming into the pipe 13 and the clean gas chamber 9 together with the clean gas.

In the conventional centrifugal separator which is provided with no guide member as above-mentioned, there exists powerful gas circulations in course of chamber 12, chamber 7 and chamber 12 which in turn cause a very unstable vortex in the centrifugation chamber 12. This unstable vortex disturbs the circling flow of particle-laden gas, hindering the separation of particles from the gas. In the centrifugal separator of this invention, however, since the conical guide portion 25 of the guide member 15 is made to project toward the center of the centrifugation chamber 12, the gas in the chamber 12 can smoothly be guided along the conical guide portion 25 toward the pipe 13, as illustrated by G3. This prevents the formation of a very unstable vortex in the chamber 12. As mentioned previously, the circulating flow through the particle discharge portion results from the pressure difference between the central portion and the outer peripheral portion of the particle discharge portion, and the volume of the circulating flow is proportional to the opening area of the discharge portion. In this invention, the guide member 15 provided at the lower portion of the centrifugation chamber 12 greatly reduces the opening area and therefore the gas flows G1 flowing past the guide member 15. If a small amount of particles P2 in the particle accumulator chamber 7 flows back into the centrifugation chamber 12 through the inner holes 27 of the guide member 15, together with the gas flow G2 the particles will easily be separated from the gas in the following manner. The gas G2 will flow up into the pipe 13 along with the other gas flow G3 guided along the conical surface of the projection 25, whereas the particles, under the action of centrifugal force, will be forced radially outwardly and collected in the annular groove 21 from which they will be discharged again into the particle accumulator chamber 7 through the outer holes 23.

Further, the particles flowing above the guide member 15 and toward the guide member 15 also are guided by the conical surface of the guide member 15 so that they are easy to be subjected to the centrifugal force, whereby the particle flows P3 are made, and the particles are trapped by the annular groove 21. Further, since the inner fine holes 27 are disposed at the lower portion of the centrifugation chamber 12 at which the pressure is relatively lower, the lower portion is raised in pressure by flowing air therein so that the gas flow G3 and particles flow P3 are effected smoothly. The fine holes 27 also serves as such that the particle flow P1 can be easily effected by flowing the gas into the centrifugation chamber 12 through the holes 27 whereby clogging of particles in the holes 23 is avoided, if the pressure difference is small between the centrifugation chamber 12 and the particle accumulator chamber 7.

FIG. 4 shows another embodiment of this invention. Referring to FIG. 4, a guide member 35A is provided with a small center hole 37 extending vertically through the top of the conical guide portion 45A, instead of the small inner holes 27, and with a recess 39 formed in the underside of the guide member 35A communicating with the central hole 37. The guide member 35, further, is provided with an annular groove 41 and outer holes 43. The operation of this embodiment is similar to that of the previous embodiment shown in FIGS. 1 to 3. The gas containing particles is taken into the centrifugation chamber 12 where particles are separated and collected in the annular groove 41. The particles thus gathered in the annular groove 41 are then discharged into the particle accumulator chamber 7 through the outer holes 43, together with the gas. This is illustrated by the dashed arrows G1 (gas flows) and the solid arrows P1 (particle flow). The gas removed of particles in the centrifugation chamber 12 is guided along the conical surface of the guide portion 45A into the pipe 13, as illustrated by the dashed arrows G3. The gas flow G5 and the particle flow P5 after flowing along the conical surface of the guide portion 45A and diverting from the gas and particle flows G4, P4, are led through the central hole 37 in the guide member 35A and discharged into the particle accumulator chamber 7, in this case, the pressure in the particle accumulator chamber 7 is lowered less than the centrifugation chamber 12.

With this embodiment, the particles in the centrifugation chamber 12 can be continuously transferred, along with the gas, to the particle accumulator chamber 7 through the outer holes 43 and the central hole 37. The guide portion 45A of the guide member 35 may take other form than the conical shape as long as it is circular in horizontal cross sections. For example, it may be shaped into an inverse-parabolic guide portion 45B as shown in FIG. 5 or into a parabolic guide portion 45C as shown in FIG. 6. The requirement that must be met is that the gas flow G3 removed of the particles can be guided along the surface of the guide portions 45B, 45C into the pipe 13.

FIG. 7 is an enlarged cross section of another embodiment showing the guide member 51 made of wear-resistant ceramics. The guide member 51 comprises a side wall portion 57, a guide portion 55, and a flat portion 56. In the flat portion 56, is formed an annular groove 59 in which holes 61 are made. At the center of the guide portion 55, an inner hole 53 and recess 63 are formed. A holder 65 with holes 67, 69, that communicate with the outer and inner small holes 61, 53 of the guide member 51 is secured to the flange of the housing 11 defining the centrifugation chamber 12 with bolt 71 and nut 73 to hold the guide member 51 between them. This construction enables the guide means 51 to be easily replaced with one made of proper material according to the medium to be treated. With this construction, it is also possible to check and clean the guide means 51 as well as the interior of the centrifugation chamber 12.

Figure 8:
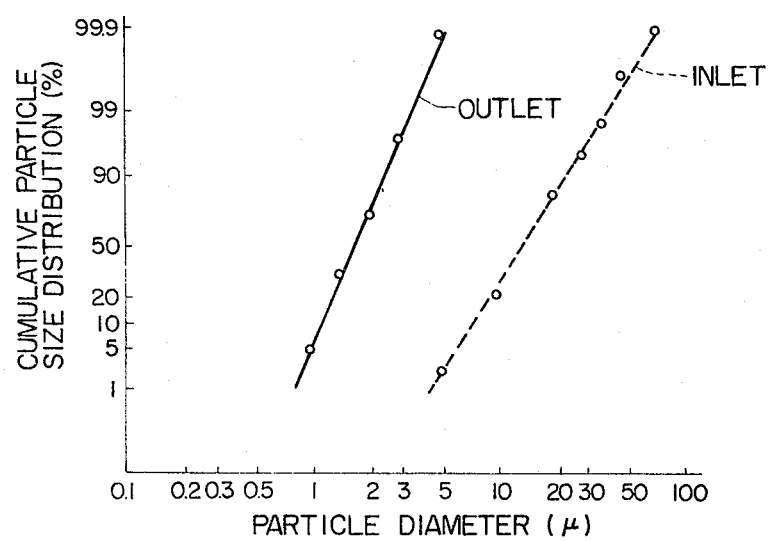
FIG. 8 is a particle size distribution diagram for the inlet and outlet of the centrifugal separator according to the invention.

FIG. 8 shows the size distribution of particles contained in the gas at the inlet and outlet of the multicentrifuge of this invention. In this figure, the abscissa represents the diameter of particles ($\mu$) and the ordinate the particle size distribution (%). The dashed line is for the case of inlet and the solid line for the outlet. From this diagram, it can be seen that the amount of particles $10\mu$ in size is about 20% of the total particles contained in the gas at the inlet and that after the separation process the gas at the outlet does not contain such large particles. This diagram also shows that the particles more than $5\mu$ in size are 100% removed.

As can be seen from the foregoing, since the centrifuge of this invention prevents the discharged particles from reentering the centrifugation chamber and also prevent the clogging of the discharge passage, a high performance can be obtained.

What is claimed is:

1. A centrifugal separator for separating particles from fluid by centrifugal force, which comprises:
   housing means for defining a centrifugation chamber;
   fluid inlet means provided in the upper portion of said housing means for introducing a fluid containing particles into said centrifugation chamber so as to whirl the fluid;
   clean fluid discharging means provided on the upper portion of said centrifugation chamber so that the end portion thereof projects coaxialy within said centrifugation chamber;
   guide means provided in the lower portion of said centrifugation chamber, said guide means comprising a flat portion and a guide portion surrounded by said flat portion and projecting into said centrifugation chamber from a central portion of said guide means for guiding the fluid flowing toward the guide portion and to direct said clean fluid to the discharging means, said projecting guide portion being of a diameter which continuously reduces from a base to a top of said guide portion, and having at least one inner fine passage extending axially through a central portion of said guide portion for communication of said centrifugation chamber and the outside;
   an annular groove formed between an inner surface of said centrifugation chamber and an outer portion of said guide means, and opened to said centrifugation chamber for trapping particles in the whirled fluid; and
   outer passage in said annular groove for discharging the trapped particles with part of the fluid out of said centrifugation chamber, said outer passage having a width substantially equal to the width of said groove to substantially span same.

2. The centrifugal separator according to claim 1, wherein said annular groove is shaped rectangularly in a section taken along the axis of the centrifugation chamber.

3. The centrifugal separator according to claim 1, wherein said guide portion is formed such that its horizontal cross section, perpendicular to the axis of said centrifugation chamber, is circular.

4. The centrifugal separator according to claim 3, wherein said guide portion is conical and project upward along the axis of the centrifugation chamber.

5. The centrifugal separator according to claim 4, wherein said guide means is made of wear-proof material.

6. The centrifugal separator according to claim 5, wherein said guide means comprises a cylindrical side wall portion, a flat portion, and said guide portion, said annular groove being formed in said flat portion along said cylindrical side wall portion.

7. The centrifugal separator according to claim 6, wherein said guide means is secured to the lower end of said housing through a holder.

8. The centrifugal separator according to claim 6, wherein said wear-proof material is a ceramic.

9. A multicentrifuge for separating particles from a gas by centrifugal force, comprising:
   a plurality of centrifugal separators arranged in adjacent relation, each of said centrifugal separators comprising a housing defining a centrifugation chamber and having gas inlet ports each formed in an upper portion thereof for admitting a gas to said centrifugation chamber while whirling it; a guide member secured to a lower portion of said housing and having an annular groove formed along the circumference of said centrifugation chamber, outer fine holes formed in said groove of a width substantially equal to the width of said groove so as to substantially span same, a guide portion projecting conically and inwardly in said centrifugation chamber; at least one inner fine passage formed axially through a central portion of said guide portion; and a gas discharge pipe secured to said housing:
   an intake passage communicating with said gas inlet ports for introducing a gas containing particles into said centrifugation chamber:
   a clean gas chamber communicating with said centrifugation chambers through said gas discharge pipes; and
   a particle accumulator chamber containing the lower end portions of said centrifugal separators and communicating with said centrifugation chambers through said outer fine holes.

* * * * *